US008351411B2

(12) United States Patent  (10) Patent No.: US 8,351,411 B2
Kim et al.  (45) Date of Patent: Jan. 8, 2013

(54) SYSTEM FOR CHANNEL SOUNDING OF BROADBAND SIGNAL CARRIER MOBILE COMMUNICATIONS AND METHOD THEREOF

(75) Inventors: Dong Kyoo Kim, Daejeon (KR); Jae Young Kim, Daejeon (KR); Kwang Roh Park, Daejeon (KR)

(73) Assignee: Electronics and Telecommunications Research Institute, Dajeon (KR)

( * ) Notice: Subject to any disclaimer, the term of this patent is extended or adjusted under 35 U.S.C. 154(b) by 165 days.

(21) Appl. No.: 12/679,066

(22) PCT Filed: May 16, 2008

(86) PCT No.: PCT/KR2008/002759
§ 371 (c)(1),
(2), (4) Date: Mar. 19, 2010

(87) PCT Pub. No.: WO2009/038269
PCT Pub. Date: Mar. 26, 2009

(65) Prior Publication Data
US 2011/0205911 A1  Aug. 25, 2011

(30) Foreign Application Priority Data

Sep. 20, 2007  (KR) .................. 10-2007-0095666

(51) Int. Cl.
*H04B 7/216*  (2006.01)
(52) U.S. Cl. ........................................ 370/342
(58) Field of Classification Search .............. 370/342; 375/347, 343
See application file for complete search history.

(56) References Cited

U.S. PATENT DOCUMENTS

| 5,031,193 | A  | * | 7/1991 | Atkinson et al. | ............... 375/231 |
| 5,751,774 | A  | * | 5/1998 | Wang | ............... 375/367 |
| 6,804,697 | B2 | * | 10/2004 | Bugeja et al. | ............... 708/805 |
| 7,492,780 | B1 | * | 2/2009 | Goolsby | ............... 370/412 |
| 7,978,624 | B2 | * | 7/2011 | Wang et al. | ............... 370/252 |
| 2006/0035643 | A1 | | 2/2006 | Vook et al. | |

FOREIGN PATENT DOCUMENTS

| KR | 1020060050414 A | 5/2006 |
| KR | 1020060096018 A | 9/2006 |
| KR | 1020070061215 A | 6/2007 |
| WO | 2007/066949 A2 | 6/2007 |

OTHER PUBLICATIONS

International Search Report: PCT/KR2008/002759.

\* cited by examiner

*Primary Examiner* — Chandrahas Patel
(74) *Attorney, Agent, or Firm* — Ladas & Parry LLP

(57) ABSTRACT

Provided are a system for channel sounding of broadband single carrier mobile communications and a method thereof. A channel sounding device is provided, which achieves precise modeling of a broadband mobile communication in a 5 GHz band. The channel sounding device can perform precise channel modeling by collecting broadband channel data of 20 MHz between a base station and a mobile station moving at maximum 150 km/h, using a sounding signal including a 802.15.3 preamble, a maximum length sequence (MLS) signal, and a single carrier frequency domain equalization (SC-FDE) symbol overcoming a limitation of signal distortion of an orthogonal frequency division multiplexing (OFDM) signal. The channel sounding device can simultaneously perform modeling of interference of an adjacent channel as well as a transmission channel.

14 Claims, 7 Drawing Sheets

Fig. 5
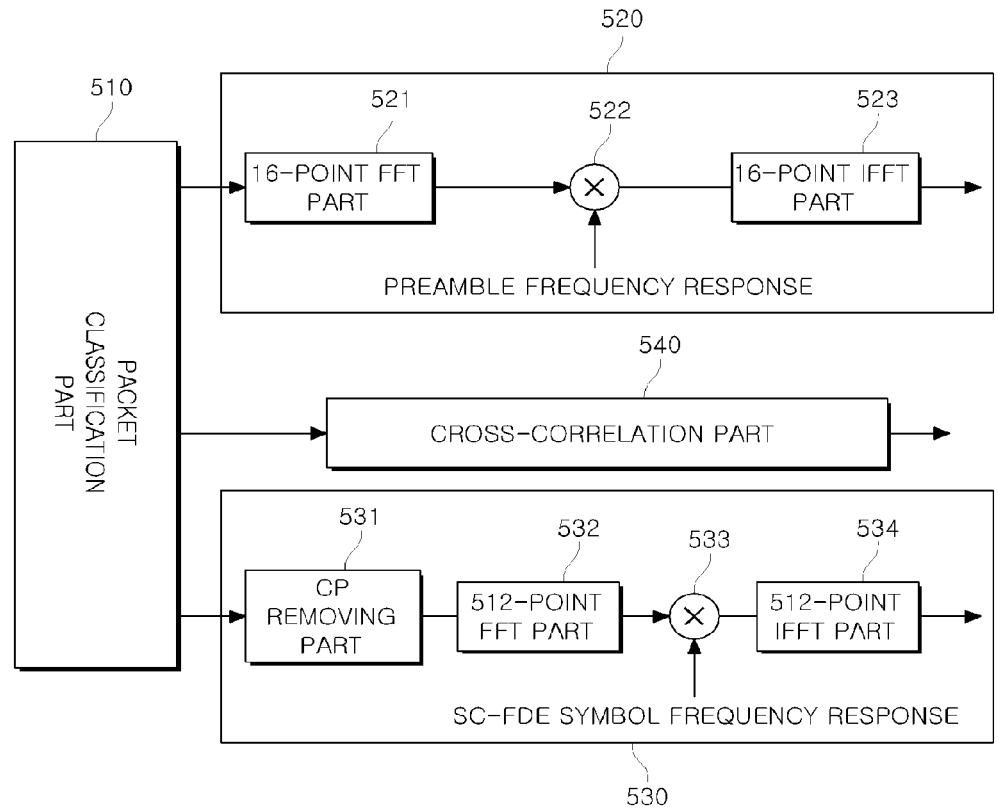
[Fig. 6]
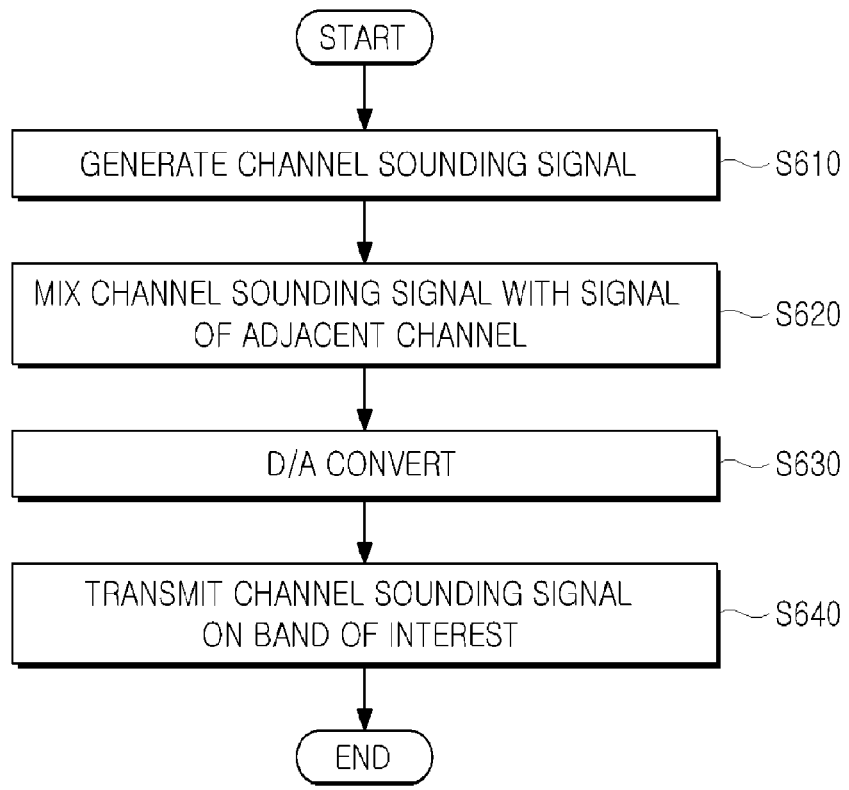

SYSTEM FOR CHANNEL SOUNDING OF BROADBAND SIGNAL CARRIER MOBILE COMMUNICATIONS AND METHOD THEREOF

This work was supported by the IT R&D program of MIC/IITA.

[2006-S-070-02, Development of Cognitive Wireless Home Networking System]

TECHNICAL FIELD

The present disclosure relates to a system for channel sounding of broadband single carrier mobile communications and a method thereof, and more particularly, to a system for channel sounding of broadband single carrier mobile communications and a method thereof, which is capable of analyzing characteristics of a broadband transmission channel and an adjacent channel by adding a single carrier frequency domain equalization (SC-FDE) symbol to a channel sounding signal.

BACKGROUND ART

To design a transceiver for broadband digital wireless communications, accurate modeling of a channel, i.e., a communication path is required. Channel modeling is a process that defines information of channel distortion as a specific structure, which occurs multipath propagation in a wireless data transmission process, and obtains variables of the specific structure.

Examples of a channel sounding device for broadband channel modeling include a sounding device using a basic M-sequence, and a sounding apparatus using an orthogonal frequency division multiplexing (OFDM) symbol using a multi-carrier.

The sounding apparatus using the M-sequence has a wide operating range and implements a simple modeling method, but has limitations in that signal loss occurs because of an unlimited channel bandwidth and high signal power in a channel area excluding a bandwidth of a channel of interest (COI).

In contrast, the sounding device using the OFDM symbol has limitations in that unless a high-performance analog device is used for an amplifier, an analog-to-digital (AD) and digital-to-analog (DA) converter and a reception signal synchronizer, distortion of the device occurs, making it difficult to perform accurate channel modeling and reducing its operating range.

Also, in the case of high-speed broadband mobile communications, high-order quadrature amplitude modulation (QAM) signal of 32-QAM or higher must be used. Thus, receiver performance may be significantly deteriorated by an influence of signal noise, channel distortion, carrier synchronization, etc.

To overcome the limitations, a high-performance analog device may be employed and/or a complicated compensation algorithm for distortion processing of the device may be used. However, this may complicate the structure of the sounding device and increases a cost.

The digital modem technique employing the multi-carrier method, such as the OFDM, has limitations of a complicated synchronization technique at a reception terminal for precise signal synchronization, an expensive linear amplifier, and an expensive AD/DA converter with high resolution. However, a digital modem technique using a single carrier method can easily implement a low-power/low-priced receiver with a simple structure, using a simple synchronization technique at a reception terminal, a low-priced amplifier and an AD/DA converter with low resolution.

However, most of current devices for channel modeling for broadband mobile communications use an OFDM signal, and there is almost no device for modeling a mobile environment channel by the single carrier method for broadband mobile communications.

Although interference of an adjacent channel is a very important issue in channel modeling of the wireless communication field using multiple channels, a related art channel modeling device uses a separate device to analyze the adjacent channel interference, which lowers efficiency of channel modeling.

DISCLOSURE OF INVENTION

Technical Problem

Therefore, an object of the present invention is to provide a system for channel sounding of broadband single carrier mobile communications and a method thereof, which can achieve accurate modeling of a broadband single-carrier mobile radio channel and analyze characteristics of not only a transmission channel but also an adjacent channel, by using a single carrier frequency domain equalization (SC-FDE) symbol that does not cause distortion by performance of an analog device.

Technical Solution

To achieve these and other advantages and in accordance with the purpose(s) of the present invention as embodied and broadly described herein, a channel sounding transmission device for broadband single carrier mobile communications in accordance with an aspect of the present invention includes: a signal generator for generating a digital channel sounding signal comprising a data symbol at a speed of a symbol rate; a digital intermediate frequency (DIF) transmitter for mixing an adjacent-channel signal of an adjacent channel with the digital channel sounding signal; a digital/analog converter for converting the digital channel sounding signal mixed with the adjacent-channel signal into an analog channel sounding signal, and outputting an IF channel sounding signal; and a radio frequency (RF) transmitter for transmitting the IF channel sounding signal on a channel of interest (COI) to be measured.

To achieve these and other advantages and in accordance with the purpose(s) of the present invention, a channel sounding reception device for broadband single carrier mobile communications in accordance with another aspect of the present invention includes: a radio frequency (RF) receiver for receiving a channel sounding signal of a channel of interest (COI), which is transmitted by a transmission device, and modulating the received channel sounding signal into an intermediate frequency (IF) channel sounding signal; an analog/digital converter for converting the IF channel sounding signal into a digital IF channel sounding signal; a digital intermediate frequency (DIF) receiver for modulating the digital IF channel sounding signal to a baseband channel sounding signal; and a sounding signal processor for analyzing the baseband channel sounding signal and measuring characteristics of the COI and an adjacent channel.

To achieve these and other advantages and in accordance with the purpose(s) of the present invention, a channel sounding transmission method for broadband single carrier mobile communications in accordance with another aspect of the present invention includes: generating a digital channel sounding signal; mixing an adjacent-channel signal of an adjacent channel with the digital channel sounding signal; converting the digital channel sounding signal mixed with the adjacent-channel signal into an analog channel sounding signal; and shifting a frequency of the analog channel sounding signal to transmit the frequency-shifted signal on a channel of interest (COI), which is a band to be measured.

To achieve these and other advantages and in accordance with the purpose(s) of the present invention, a channel sounding reception method for broadband single carrier mobile communications in accordance with another aspect of the present invention includes: receiving a transmitted channel sounding signal of a COI and modulating the channel sounding signal to an intermediate frequency (IF) channel sounding signal; converting the IF channel sounding signal into a digital IF channel sounding signal; and modulating the digital IF channel sounding signal to a baseband channel sounding signal; and analyzing the baseband channel sounding signal to calculate characteristics of the COI and an adjacent channel.

Advantageous Effects

A system for channel sounding of broadband single-carrier mobile communications and a method thereof according to the present invention can improve performance of mobile-channel modeling using a single carrier method by employing a recursive least square (RLS) equalizer, and can improve channel sounding performance in a high-speed broadband mobile communication environment by employing a single carrier frequency domain equalization (SC-FDE) method.

Also, in the system for channel sounding of broadband single-carrier mobile communications and the method thereof according to the present invention, a relatively simple structure is achieved with a low-priced element, and interference of both a channel of interest (COI) and an adjacent channel can be measured simultaneously. Also, since a sounding function and a storage function are separated, the structure of the system for channel sounding is simplified and storage capacity is not limited, so that a signal period, a signal storage duration and a measurement scenario can be diversified.

BRIEF DESCRIPTION OF THE DRAWINGS

FIG. 5 is a block diagram illustrating a channel estimation unit according to an embodiment of the present invention.

FIG. 6 is a flowchart illustrating operations of a channel sounding transmission device according to an embodiment of the present invention.

BEST MODE FOR CARRYING OUT THE INVENTION

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
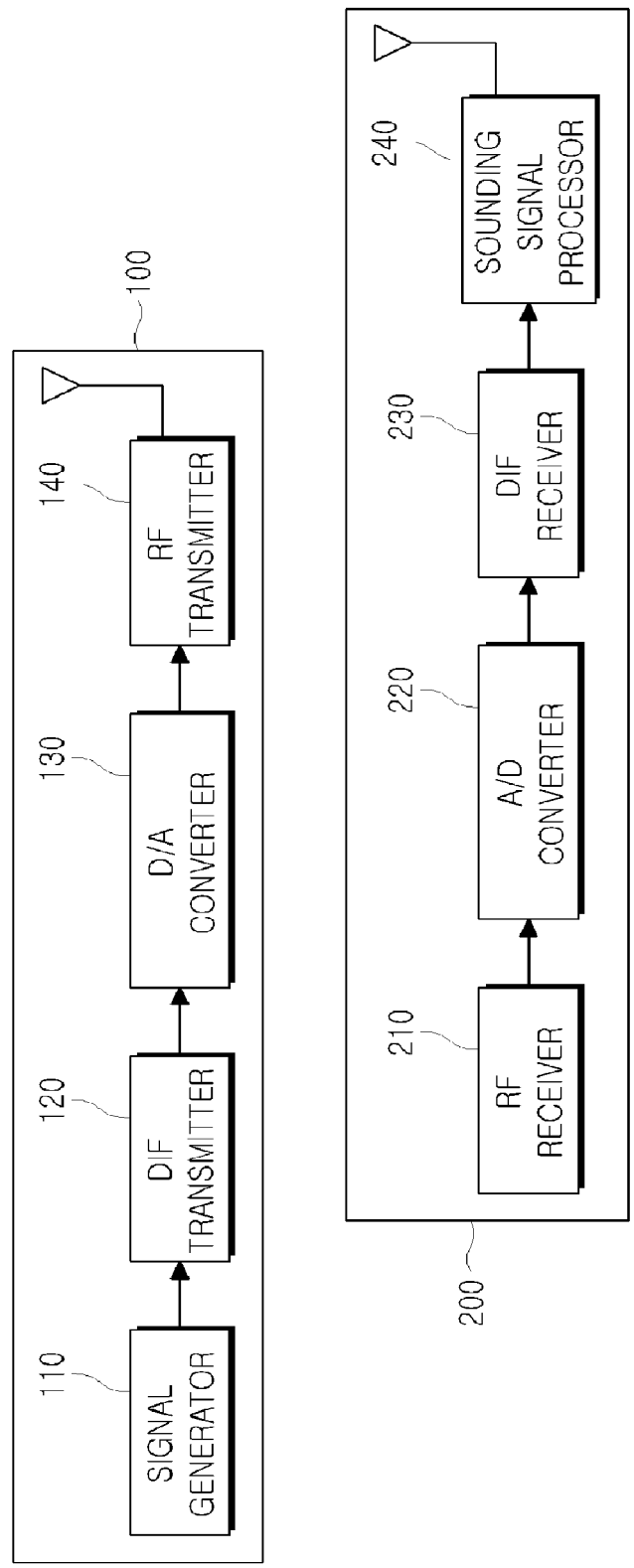
FIG. 1 is a block diagram illustrating a system for channel sounding of broadband single-carrier mobile communications according to an embodiment of the present invention.

FIG. 1 is a block diagram illustrating a system for channel sounding of broadband single carrier mobile communications. As shown in FIG. 1, the system for channel sounding of broadband single carrier mobile communications includes a transmission device 100 for generating a channel sounding signal, mixing an adjacent-band signal with the channel sounding signal and transmitting the resulting signal on a channel of interest (COI), and a reception device 200 for receiving the channel sounding signal of the COI and analyzing a channel characteristic.

The transmission device 100 includes a signal generator 110 for generating a digital channel sounding signal, a digital intermediate frequency (DIF) transmitter 120 for mixing an adjacent-channel signal of an adjacent channel with the digital channel sounding signal, a digital/analog (D/A) converter 130 for converting the digital channel sounding signal mixed with the adjacent-channel signal into an analog channel sounding signal, and outputting an IF channel sounding signal, and a radio frequency (RF) transmitter 140 for transmitting the IF channel sounding signal on the COI.

The signal generator 110 generates a digital channel sounding signal at a speed of a symbol rate.

The digital channel sounding signal is a packet including a preamble, a maximum level sequence, a single carrier-frequency domain equalization (SC-FDE) symbol, and a guard interval inserted between the MLS and the SC-FDE symbol.

The DIF transmitter 120 includes a pulse shaping filter (not shown) and a digital mixer (not shown). The pulse shaping filter (not shown) limits over-sampling and a bandwidth of the digital channel sounding signal, and the digital mixer (not shown) mixes an adjacent-band signal with the digital channel sounding signal and outputs it to the D/A converter 130.

Since the DIF transmitter 120 mixes the adjacent-band signal during a digital signal processing procedure, various adjacent-band signals can be easily generated and thus various experiment data can also be easily obtained.

The D/A converter 130 converts the channel sounding signal mixed with the adjacent-band signal to output an analog IF channel sounding signal.

The RF transmitter 140 frequency-shifts the IF channel sounding signal to a COI, i.e., an RF band to be measured by a mixing process, and transmits the frequency-shifted signal.

The reception device 200 includes an RF receiver 210 for receiving the transmitted channel sounding signal of the COI and modulating the received signal into an IF channel sounding signal, an A/D converter 220 for converting the IF channel sounding signal into a digital IF channel sounding signal, a DIF receiver 230 for modulating the digital IF channel sounding signal into a baseband channel sounding signal, and a sounding signal processor 240 for analyzing the baseband channel sounding signal and measuring a characteristic of a radio channel.

The RF receiver 210 receives the transmitted channel sounding signal of the COI and modulates it to an IF channel sounding signal by frequency-shifting.

The A/D converter 220 receives the IF channel sounding signal and converts it into a digital IF channel sounding signal.

The DIF receiver 230 modulates the digital IF channel sounding signal to a baseband channel sounding signal by frequency shifting.

The sounding signal processor 240 receives the baseband channel sounding signal and analyzes characteristics of the COI and the adjacent-channel.

Figure 2:
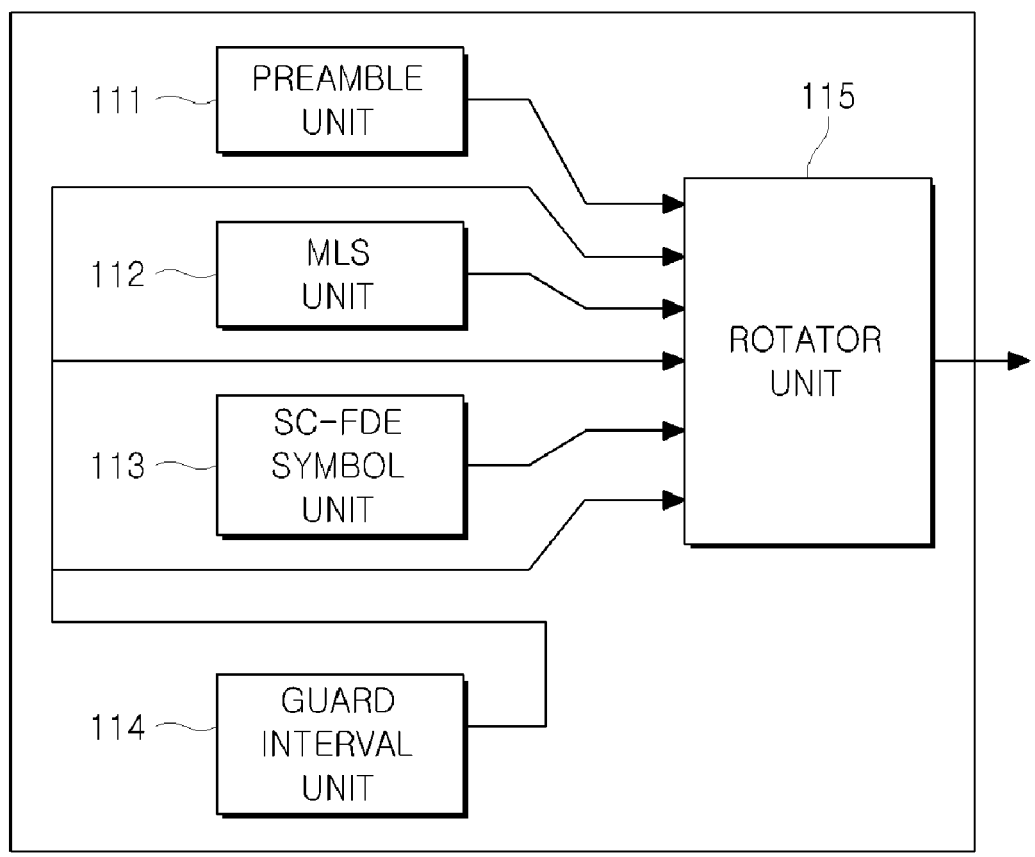
FIG. 2 is a block diagram illustrating a signal generator according to an embodiment of the present invention.

FIG. 2 is a block diagram illustrating the signal generator 110 according to an embodiment of the present invention. As shown in FIG. 2, the signal generator 110 includes a preamble unit 111 for generating a preamble, an maximum length sequence (MLS) unit 112 for generating an MLS, a single carrier frequency domain equalization (SC-FDE) symbol unit 113 for generating an SC-FDE symbol, a guard interval unit 114 for generating a guard interval signal, and a rotator unit 115 for sequentially connecting the preamble, the MLS, the SC-FDE and the guard interval signal to output them as a packet.

The preamble unit 111 generates a preamble signal of a channel sounding signal. The Doppler spectrum can be estimated because the generated preamble is for 802.15.3.

The MLS unit 112 generates an MLS signal that is a periodic signal having constant regularity and used as pseudo white noise, and can efficiently obtain cross-correlation.

The SC-FDE symbol unit 113 generates an SC-FDE symbol having 128 cyclic prefixes (CP). According to the present invention, the fine Doppler spectrum estimation is employed using the SC-FDE symbol, so that precise modeling of a frequency-shifted state can be done.

The guard interval unit 114 generates a guard interval signal which is a 0 signal in order to place guard intervals between sounding signals, i.e., the preamble, the MLS and the SC-FDE.

The rotator unit 115 selective receives outputs of the preamble unit 111, the MLS unit 112 and the SC-FDE symbol unit 113, and combines a preamble, an MLS and an SC-FDE symbol in the time order to output a channel sounding signal as a packet.

Figure 3:
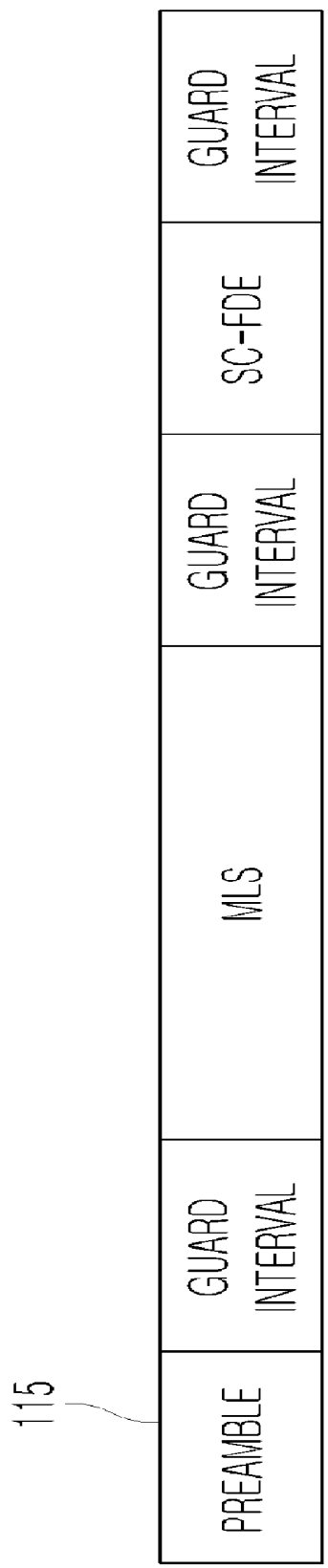
FIG. 3 illustrates a format of a channel sounding signal packet according to an embodiment of the present invention.

FIG. 3 illustrates a format of a channel sounding signal packet according to an embodiment of the present invention. As shown in FIG. 3, the channel sounding signal includes a preamble 300, an MLS 320 an SC-FDE 330 and guard intervals respectively existing between sounding signals.

Table 1 shows an example of an environment measurable by a channel sounding system according to an embodiment of the present invention.

TABLE 1

| Moving body speed(km/h) | Moving distance per sec(m) | Coherence time(usec) |
|---|---|---|
| 60 | 16.67 | 597 |
| 80 | 22.22 | 448 |
| 100 | 27.78 | 358 |
| 150 | 41.67 | 239 |

As shown in Table 1, when the speed of the moving body, i.e., the speed of a channel sounding signal transmission/reception device in a moving state is 150 km/h, the coherence time is 239 usec. Thus, for channel modeling of the moving body, a channel sounding packet having a period shorter than associated coherence time must be designed.

Figure 4:
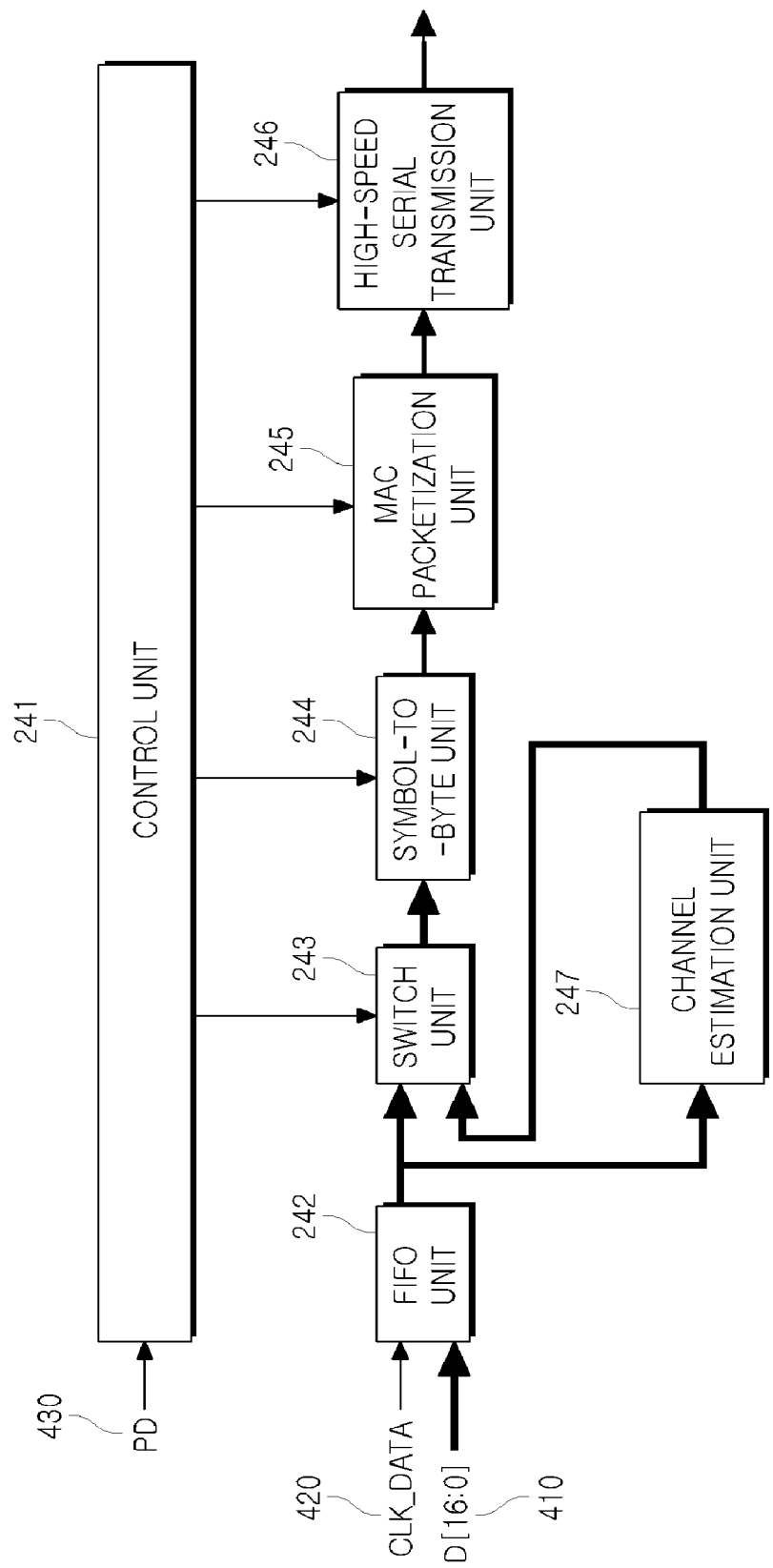
FIG. 4 is a block diagram illustrating a sounding signal processor according to an embodiment of the present invention.

FIG. 4 is a block diagram illustrating the sounding signal processor 240 according to an embodiment of the present invention. As shown in FIG. 4, the sounding signal processor 240 includes a first in first out (FIFO) unit 242 for temporally storing a digital channel sounding signal in synchronization with a synchronous clock, a switch unit 243 to be described below, a channel estimation unit 247 for analyzing an output of the FIFO unit 242 to calculate a channel response, a symbol-to-byte unit 244 for converting the channel sounding signal or the channel response into bytes, a media access control (MAC) packetization unit 245 for converting an output of the symbol-to-byte unit 244 into an Ethernet packet, a high-speed serial transmission unit 246 for transmitting the Ethernet packet to a host personal computer (PC) (not shown), and a control unit 241 for controlling each of the units of the sounding signal processor 240 so as to transmit the received channel sounding signal or the channel response to the host PC (not shown) in synchronization with the PD signal. When a packet detection (PD) signal is detected, the switch unit 243 connects a first path of one end of the switch unit 243 to the other end thereof to transmit the digital channel sounding signal stored in the FIFO unit 242 to the symbol-to-byte unit 244, and then transmits an output of the channel estimation unit 247 to the symbol-to-byte unit 247 by switching a second path of the one end to the other end thereof, Besides, the reception device 200 further includes a PD signal generator (not shown) for generating a PD signal (PD) 430 indicating a time point of signal storage, and a clock generator (not shown) generating a synchronous clock. The PD signal generator (not shown) and the clock generator (not shown) may be included in one area of any one of elements of the channel sounding transmission/reception device.

A baseband channel sounding signal output by the DIF receiver 230 is input as 16-bit parallel data (D[16:0]) 410 to the sounding signal processor 240.

The FIFO unit 242 is a FIFO buffer, which temporally stores therein the D[16:0] 410 input to the sounding signal processor 240 in synchronization with a synchronous clock (CLK-DATA) 420.

The channel estimator 247 receives the channel sounding signal output from the FIFO unit 242 and calculates channel responses of a COI and an adjacent channel.

The switch unit 243 transmits an output of the FIFO unit 242 or the channel estimation unit 247 to the symbol-to-byte unit 244 under the control of the control unit 241.

In the switch unit 243, a first path of one end of the switch unit 243 is connected to an output of the FIFO unit 242, a second path of the one end is connected to an output of the channel estimation unit 247, and the other end of the switch unit 243 is connected to the symbol-to-byte unit 244. When the PD signal is detected, the first path of the one end of the switch unit 243 is connected with the other end thereof to transmit the channel sounding signal stored in the FIFO unit 242 to the symbol-to-byte unit 244, and then the second path of the one end is connected to the other end to transmit a channel response to the symbol-to-byte unit 244.

The symbol-to-byte unit 244 converts the received channel sounding signal output from the FIFO unit 242 or the channel response estimated by the channel estimation unit 247 into bytes facilitating Ethernet transmission.

The MAC packetization unit 245 converts the bytes of the channel sounding signal or the channel response into an Ethernet packet.

The high-speed serial transmission unit 246 transmits the Ethernet packet output from the MAC packetization unit 245 to the host PC (not shown).

The Host PC (not shown) stores the received channel sounding signal and the channel response output by the channel estimation unit 247.

The control unit 241 controls operations of the switch unit 243, the symbol-to-byte unit 244, the MAC packetization unit 245, the high-speed serial transmission unit 246 and the channel estimation unit 247.

To sum up, the received channel sounding signal is stored in the FIFO unit 242 in synchronization with the synchronous clock, and the stored channel sounding signal is input to the channel estimation unit 247 and the switch unit 243.

When the PD signal is detected, the control unit 241 provides control such that an output of the FIFO unit 242 is converted into an Ethernet packet via the first path of the one end of the switch unit 243, the other end of the switch unit 243, the symbol-to-byte unit 244 and the MAC packetization unit 245. The Ethernet packet is transmitted to the host PC (not shown) through the high-speed serial transmission unit 246.

The channel sounding signal increases in proportion to reception time and thus occupies large capacity. Therefore, the channel sounding signal is stored in the host PC (not shown) as a database, thereby reducing complexity of the sounding apparatus.

FIG. 5 is a block diagram illustrating the channel estimation unit 247 according to an embodiment of the present invention. As shown in FIG. 5, the channel estimation unit 247 includes a packet classification part 510 for classifying an output of the FIFO unit 242 into a preamble, an MLS and an SC-FDE symbol, a preamble estimation part 520 for outputting a frequency response and an impulse response of the preamble signal, a cross-correlation part 540 for outputting an impulse response from the MLS signal, and an SC-FDE estimation part 530 for outputting a channel frequency response and an channel impulse response of the SC-FDE symbol.

The packet classification part 510 classifies the received channel sounding signal output by the FIFO unit 242 into a preamble, an MLS and an SC-FDE symbol.

The preamble estimation part 520 includes a 16-point Fast Fourier Transform (FFT) portion 521, a first multiplier 52, and a 16-point Inverse Fast Fourier Transform (IFFT) portion 523, and receives a preamble signal and outputs a frequency response and an impulse response.

The 16-point FFT portion 521 performs FFT on the preamble signal, and the first multiplier 522 performs complex multiplication on an output of the 16-point FFT portion 521 to output a frequency response of the preamble signal. The 16-point IFFT portion 523 performs IFFFT on a complex-multiplied output of the 16-point FFT portion 521, thereby outputting an impulse response.

The cross-correlation part 541 receives the MLS signal and outputs an impulse response.

The SC-FDE estimation part 530 includes a cyclic prefix (CP) removing portion 531, a 512-point FFT portion 532, a second multiplier 533 and a 512-point IFFT portion 534, and receives the SC-FDE symbol and outputs a channel frequency response and a channel impulse response.

The CP removing portion 531 controls 128 CPs from the SC-FDE symbol which is input as a first component of the SC-FDE estimation part 530, and the 512-point FFT portion 532 receives the CP-removed SC-FDE symbol, performs FFT on the CP-removed SC-FDE symbol, and transmits it to the second multiplier 533.

The second multiplier 533 performs complex multiplication on an output of the 512-point FFT portion 532 to output a channel frequency response, and the 512-point IFFT portion 534 performs IFFT on a complex-multiplied output of the 512-point FFT portion 523 to output a channel impulse response.

FIG. 6 is a flowchart illustrating operations of the channel sounding transmission device 100 according to an embodiment of the present invention.

Referring to FIG. 6, in operation S610, a digital channel sounding signal of a packet type where a preamble, an MLS and an SC-FDE symbol are combined is generated.

Each of sounding signals, i.e., the preamble, the MLS and the SC-FDE symbol, and 0 signals for guard intervals are generated, and the sounding signals and the guard intervals between the sounding signals are sequentially connected, thereby generating a packet of the digital channel sounding signal.

To measure interference of an adjacent channel simultaneously in channel modeling, a signal of the adjacent channel is mixed with the generated digital channel sounding signal in operation S620.

Since an adjacent-band signal is mixed in a digital signal processing procedure, various adjacent-band signals can be easily generated, and thus various experiment data can also be easily obtained.

In operation S630, the mixed digital channel sounding signal is converted into an analog channel sounding signal.

In operation S640, the analog channel sounding signal is modulated by frequency shift keying so as to be transmitted on a COI, which is a band to be measured.

Figure 7:
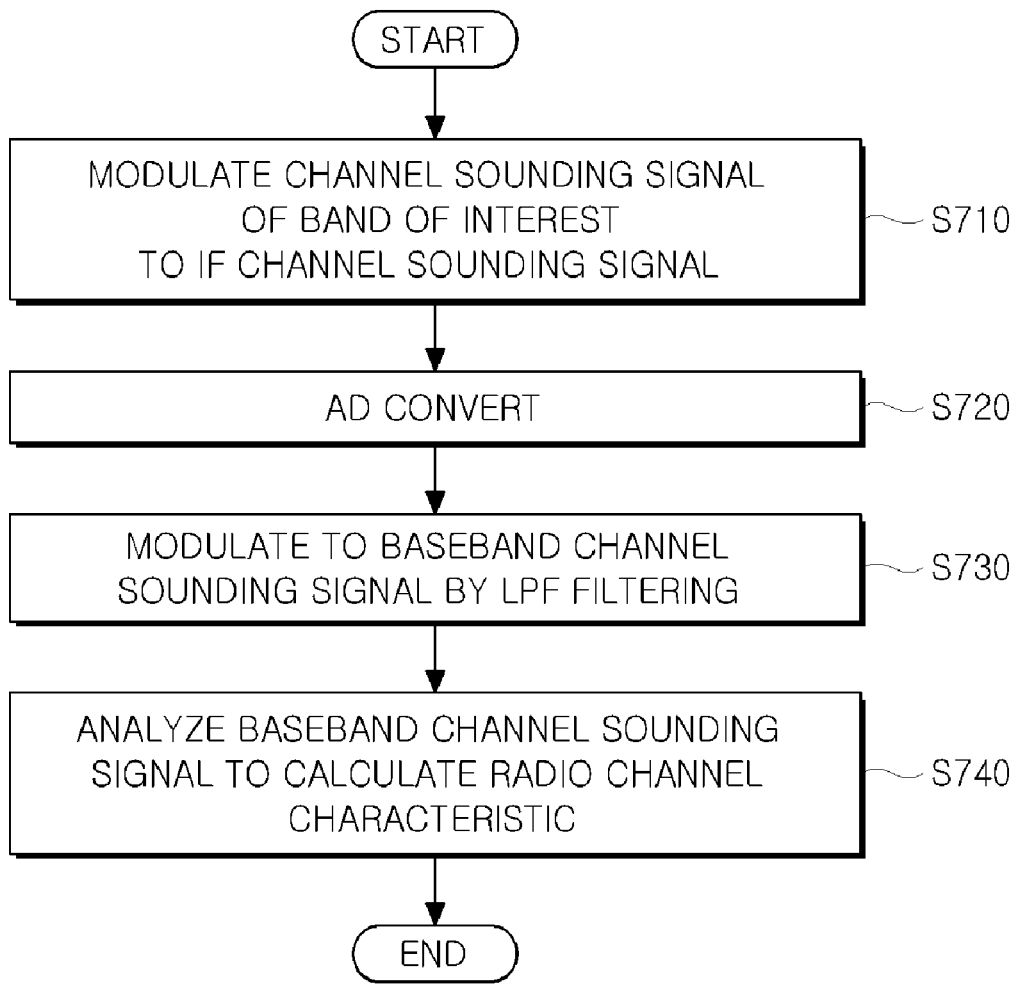
FIG. 7 is a flowchart illustrating operations of a channel sounding reception device according to an embodiment of the present invention.

FIG. 7 is a flowchart illustrating operations of the channel sounding reception device 200 according to an embodiment of the present invention.

Referring to FIG. 7, in operation S710, the channel sounding signal of the COI transmitted from the transmission device 100 is received and modulated to an IF channel sounding signal.

In operation S720, the analog IF channel sounding signal is converted into a digital IF channel sounding signal.

In operation S730, the digital IF channel sounding signal is modulated to a baseband channel sounding signal by frequency shift keying.

In operation S740, the baseband channel sounding signal is analyzed so that a characteristic of the channel can be analyzed.

Figure 8:
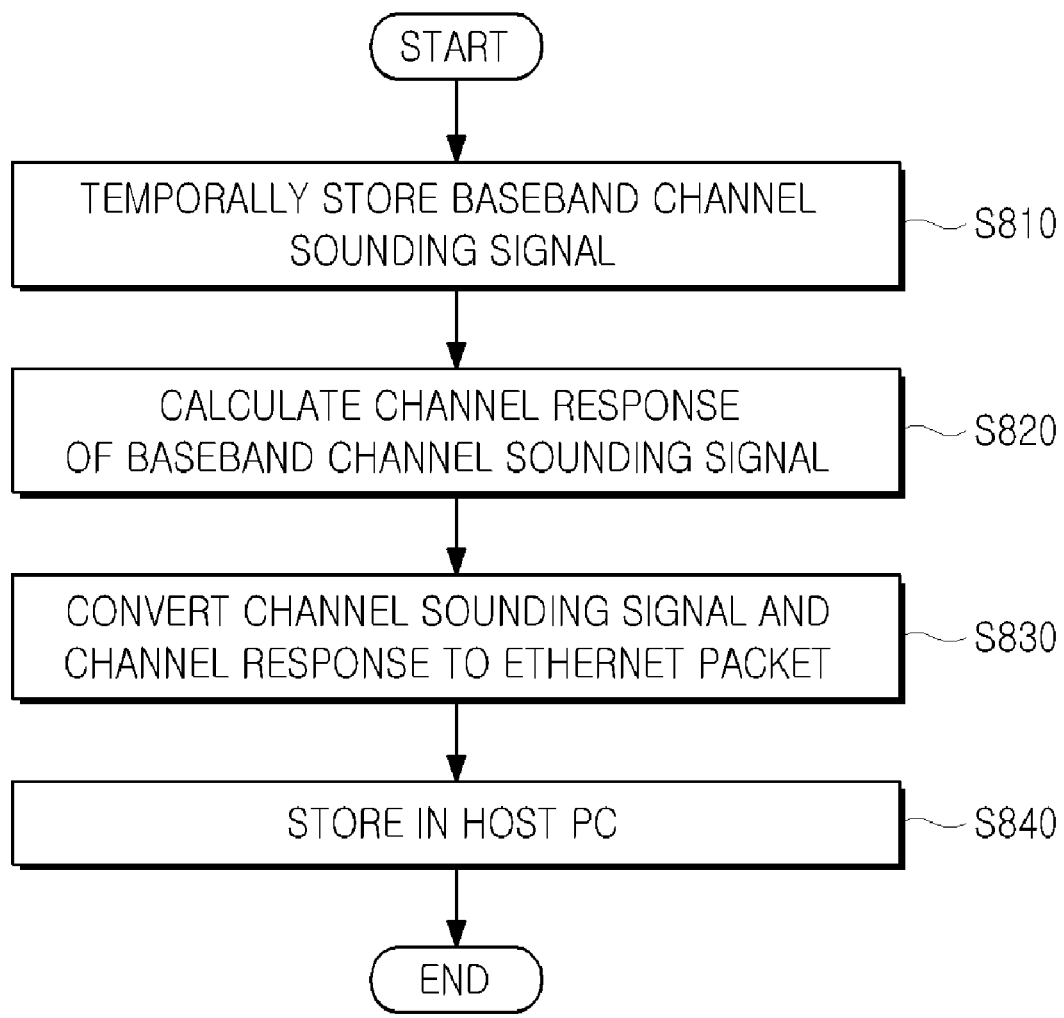
FIG. 8 is a flowchart illustrating an operation of calculating a channel response of a channel sounding signal according to an embodiment of the present invention.

FIG. 8 is a flowchart illustrating an operation of calculating a channel response of a channel sounding signal according to an embodiment of the present invention.

Referring to FIG. 8, in operation S810, a channel sounding signal is temporarily stored in synchronization with a synchronous clock.

In operation S820, the stored channel sounding signal is analyzed to calculate a channel response.

In detail, the temporarily stored signal is classified into a preamble, an MLS and an SC-FDE symbol, and calculates a channel response of each signal through FFT, complex multiplication and IFFT or cross-correlation.

In operation S830, the baseband channel sounding signal or the channel response estimated by the channel estimation part 247 is converted into an Ethernet packet.

In operation S840, the converted Ethernet packet is transmitted and stored in a host PC (not shown) connected to the channel sounding system through the Ethernet.

The channel sounding system according to the present invention performs only a channel sounding function, and the host PC (not shown) connected through a high-speed serial transmission interface has a storage function, so that apparatus con-figuration can be simplified, and storage capacity is not limited.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

INDUSTRIAL APPLICABILITY

A system for channel sounding of broadband single-carrier mobile communications and a method thereof according to the present invention can improve performance of mobile-channel modeling using a single carrier method by employing a recursive least square (RLS) equalizer, and can improve channel sounding performance in a high-speed broadband mobile communication environment by employing a single carrier frequency domain equalization (SC-FDE) method.

Also, in the system for channel sounding of broadband single-carrier mobile communications and the method thereof according to the present invention, a relatively simple structure is achieved with a low-priced element, and interference of both a channel of interest (COI) and an adjacent channel can be measured simultaneously. Also, since a sounding function and a storage function are separated, the structure of the system for channel sounding is simplified and storage capacity is not limited, so that a signal period, a signal storage duration and a measurement scenario can be diversified.

The invention claimed is:

1. A channel sounding reception method for broadband single carrier mobile communications, the method comprising:
receiving a transmitted channel sounding signal of a COI and modulating the channel sounding signal to an intermediate frequency (IF) channel sounding signal;
converting the IF channel sounding signal into a digital IF channel sounding signal; and
modulating the digital IF channel sounding signal to a baseband channel sounding signal; and
analyzing the baseband channel sounding signal to calculate characteristics of the COI and an adjacent channel, wherein the calculating of the characteristics of the COI and the adjacent channel comprises:
temporarily storing the baseband channel sounding signal;
analyzing the stored channel sounding signal to calculate a channel response;
converting the calculated channel response or the baseband channel sounding signal into an Ethernet packet; and
transmitting the converted Ethernet packet to a host personal computer (PC) connected with the channel sounding system, and storing the Ethernet packet in the host PC.

2. The method of claim 1, wherein the calculating of the channel response comprises:
classifying the temporally stored signal into a preamble, a maximum length sequence (MLS) and an SC-FDE symbol; and
calculating a channel response of the classified signal.

3. A channel sounding transmission device for broadband single carrier mobile communications, the channel sounding transmission device comprising:
a signal generator for generating a digital channel sounding signal comprising a data symbol at a speed of a symbol rate;
a digital intermediate frequency (DIF) transmitter for mixing an adjacent-channel signal of an adjacent channel with the digital channel sounding signal;
a digital/analog converter for converting the digital channel sounding signal mixed with the adjacent-channel signal into an analog channel sounding signal, and outputting an IF channel sounding signal; and
a radio frequency (RF) transmitter for transmitting the IF channel sounding signal on a channel of interest (COI) to be measured,
wherein the digital channel sounding signal is a packet containing a preamble, a maximum length sequence (MLS), a single carrier-frequency domain equalizer (SC-FDE) symbol, and a guard interval signal serving as interval between sounding signals,
wherein the signal generator comprises:
a preamble unit for generating the preamble;
a maximum length sequence (MLS) unit for generating the MLS;
an SC-FDE symbol unit for generating the SC-FDE symbol including a cyclic prefix (CP);
a guard interval unit for generating the guard interval signal; and
a rotator for selectively receiving and sequentially connecting the preamble, the MLS, the SC-FDE, and the guard interval signal to output a packet.

4. The channel sounding transmission device of claim 3, wherein the DIF transmitter comprises a pulse shaping filter for filtering the digital channel sounding signal to limit oversampling and a bandwidth of the digital channel sounding signal.

5. The channel sounding transmission device of claim 3, wherein the MLS is a periodic signal having constant regularity and used as pseudo white noise, and can obtain cross-correlation.

6. A channel sounding reception device for broadband single carrier mobile communications, the channel sounding reception device comprising:
a radio frequency (RF) receiver for receiving a channel sounding signal of a channel of interest (COI), which is transmitted by a transmission device, and modulating the received channel sounding signal into an intermediate frequency (IF) channel sounding signal;
an analog/digital converter for converting the IF channel sounding signal into a digital IF channel sounding signal;
an digital intermediate frequency (DIF) receiver for modulating the digital IF channel sounding signal to a baseband channel sounding signal; and a sounding signal processor for analyzing the baseband channel sounding signal and measuring characteristics of the COI and an adjacent channel, wherein the sounding signal processor is connected with a host personal computer (PC) by Ethernet, the host PC storing a received channel sounding signal and a channel response of the channel sounding signal.

7. A channel sounding reception device for broadband single carrier mobile communications, the channel sounding reception device comprising:
a radio frequency (RF) receiver for receiving a channel sounding signal of a channel of interest (COI), which is transmitted by a transmission device, and modulating the received channel sounding signal into an intermediate frequency (IF) channel sounding signal;
an analog/digital converter for converting the IF channel sounding signal into a digital IF channel sounding signal;

an digital intermediate frequency (DIF) receiver for modulating the digital IF channel sounding signal to a baseband channel sounding signal; and
a sounding signal processor for analyzing the baseband channel sounding signal and measuring characteristics of the COI and an adjacent channel, wherein the sounding signal processor comprises:
a first in first out (FIFO) unit for temporally storing the digital channel sounding signal in synchronization with a synchronous clock;
a channel estimation unit for analyzing an output of the FIFO unit and calculating a channel response;
a symbol-to-byte unit for converting an output of the FIFO unit and an output of the channel estimation unit into bytes;
a switch unit comprising one end including a first path connected with an output of the FIFO unit and a second path connected with an output of the channel estimation unit, and the other end connected with the symbol-to-byte unit, wherein
when a packet detection (PD) signal is detected, the first path is connected with the other end to transmit the channel sounding signal output by the FIFO unit to the symbol-to-byte unit, and then the second path is switched to the other end to transmit the channel response to the symbol-to-byte unit;
a media access control (MAC) packetization unit for converting an output of the symbol-to-byte unit into an Ethernet packet;
a high-speed serial transmission unit for transmitting the Ethernet packet to a host personal computer (PC); and
a control unit for controlling each unit of the sounding signal processor.

8. The channel sounding reception device of claim 7, further comprising:
a packet detection (PD) signal generator for generating a PD signal indicating a time point of signal storage; and
a clock generator for generating a synchronous clock.

9. The channel sounding reception device of claim 7, wherein the channel estimation unit comprises:
a packet classification part for classifying an output of the FIFO unit into a preamble, a maximum length sequence (MLS) and a single carrier frequency domain equalizer (SC-FDE) symbol;
a preamble estimation part for outputting a frequency response and an impulse response of the preamble signal;
a cross-correlation part for outputting an impulse response from the MLS signal; and
an SC-FDE estimation part for outputting a channel frequency response and a channel impulse response of the SC-FDE.

10. The channel sounding reception device of claim 9, wherein the preamble estimation part comprises:
a 16-point Fast Fourier Transform (FFT) portion for performing FFT on the preamble signal;
a first multiplication portion for performing complex multiplication on an output of the 16-point FFT portion to output a frequency response of the preamble signal; and
a 16-point Inverse Fast Fourier Transform (IFFT) portion for performing IFFT on the frequency response to output an impulse response.

11. The channel sounding reception device of claim 9, wherein the SC-FDE estimation part comprises:
a cyclic prefix (CP) removing portion for removing a CP of the SC-FDE symbol;
a 512-point Fast Fourier Transform (FFT) portion for performing FFT on the SC-FDE symbol;
a second multiplication portion for performing complex multiplication on an output of the 512-point FFT portion to output a channel frequency response; and
a 512-point Inverse Fast Fourier Transform (IFFT) portion for performing IFFT on the channel frequency response to output a channel impulse response.

12. A channel sounding transmission method for broadband single carrier mobile communications, the method comprising:
generating a digital channel sounding signal;
mixing an adjacent-channel signal of an adjacent channel with the digital channel sounding signal;
converting the digital channel sounding signal mixed with the adjacent-channel signal into an analog channel sounding signal; and
shifting a frequency of the analog channel sounding signal to transmit the frequency-shifted signal on a channel of interest (COO, which is a band to be measured;
receiving a transmitted channel sounding signal of a COI and modulating the channel sounding signal to an intermediate frequency (IF) channel sounding signal;
converting the IF channel sounding signal into a digital IF channel sounding signal;
modulating the digital IF channel sounding signal to a baseband channel sounding signal; and
analyzing the baseband channel sounding signal to calculate characteristics of the COI and an adjacent channel, wherein the calculating of the characteristics of the COI and the adjacent channel comprises:
temporarily storing the baseband channel sounding signal;
analyzing the stored channel sounding signal to calculate a channel response;
converting the calculated channel response or the baseband channel sounding signal into an Ethernet packet; and
transmitting the converted Ethernet packet to a host personal computer (PC) connected with the channel sounding system, and storing the Ethernet packet in the host PC.

13. The method of claim 12, wherein the generating of the digital channel sounding signal comprises:
generating a preamble, a maximum length sequence (MLS), a single carrier frequency domain equalizer (SC-FDE) symbol and a guard interval signal; and
sequentially connecting the preamble, the MSL, the SC-FDE symbol and the guard interval signal to combine them as a packet and output the packet.

14. The method of claim 12, wherein the calculating of the channel response comprises:
classifying the temporally stored signal into a preamble, a maximum length sequence (MLS) and an SC-FDE symbol; and
calculating a channel response of the classified signal.

* * * * *